US012810717B2

(12) United States Patent
Tucker

(10) Patent No.: US 12,810,717 B2
(45) Date of Patent: Nov. 24, 2026

(54) TRACKING SYSTEM SUPPORTED BY TELECOMMUNICATIONS SERVICE CONFIGURED FOR PERSONAL SAFETY AND SECURITY

(71) Applicant: T-Mobile USA, Inc., Bellevue, WA (US)

(72) Inventor: Wilfred I. Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 72 days.

(21) Appl. No.: 19/064,575

(22) Filed: Feb. 26, 2025

(65) Prior Publication Data

US 2025/0201105 A1 Jun. 19, 2025

Related U.S. Application Data

(63) Continuation of application No. 18/307,758, filed on Apr. 26, 2023, now Pat. No. 12,260,738.

(51) Int. Cl.
*G08B 25/01* (2006.01)
*G08B 17/103* (2006.01)

(52) U.S. Cl.
CPC ......... *G08B 25/016* (2013.01); *G08B 17/103* (2013.01)

(58) Field of Classification Search
None
See application file for complete search history.

(56) References Cited

U.S. PATENT DOCUMENTS

| | | | |
|---|---|---|---|
| 9,600,571 | B2 | 3/2017 | Shaashua et al. |
| 9,752,840 | B1 | 9/2017 | Betro |
| 9,900,171 | B2 | 2/2018 | Guedalia et al. |
| 10,051,068 | B2 | 8/2018 | Sharma et al. |
| 10,178,530 | B2 | 1/2019 | Forood et al. |
| 10,212,494 | B1 | 2/2019 | Struhsaker et al. |
| 10,511,950 | B2 | 12/2019 | Maier et al. |
| 10,631,040 | B2 | 4/2020 | Britt |
| 10,659,144 | B1 | 5/2020 | Tofighbakhsh et al. |

(Continued)

FOREIGN PATENT DOCUMENTS

| | | |
|---|---|---|
| CN | 101854739 A | 10/2010 |
| CN | 108415350 A | 8/2018 |

(Continued)

OTHER PUBLICATIONS

"SyncUP Tracker", https://www.t-mobile.com/support/devices/syncup-tracker-s#about.

*Primary Examiner* — Thomas S Mccormack
(74) *Attorney, Agent, or Firm* — Ashurst Perkins Coie US LLP

(57) ABSTRACT

A tracking system is configured for personal safety and security. The tracking system includes an Internet of Things (IoT) device having a multifunctional ultraviolet (UV) light sensor and optionally includes one or more Time of Flight (ToF) sensors. The multifunctional UV sensor is used to detect when smoke particles exceed a threshold and when UV light exceeds a threshold. The thresholds vary depending on the location of the IoT device. The system can present an alert to a user when the thresholds are exceeded. The ToF sensor(s) can be used to build a baseline three-dimensional (3D) visualization of a secured zone, and alert the user of the presence of an unexpected person in that zone based on the 3D visualization.

20 Claims, 5 Drawing Sheets

(56) References Cited

U.S. PATENT DOCUMENTS

| | | | |
|---|---|---|---|
| 10,816,944 B2 | 10/2020 | Britt et al. |
| 11,176,744 B2 | 11/2021 | Bleyer et al. |
| 11,349,927 B2 | 5/2022 | Shah et al. |
| 11,595,786 B2 | 2/2023 | Ahrens |
| 2016/0065653 A1 | 3/2016 | Chen et al. |
| 2016/0073482 A1 | 3/2016 | Fok et al. |
| 2018/0095155 A1 | 4/2018 | Soni et al. |
| 2020/0126041 A1 | 4/2020 | Velusamy Sivasamy |
| 2020/0145793 A1 | 5/2020 | Coulbourne et al. |
| 2020/0162500 A1 | 5/2020 | Ciocarlie et al. |
| 2022/0345869 A1 | 10/2022 | Ahrens |
| 2022/0377560 A1 | 11/2022 | Zeng |
| 2023/0013658 A1 | 1/2023 | Britt et al. |

FOREIGN PATENT DOCUMENTS

| | | | |
|---|---|---|---|
| CN | 111176241 | A | 5/2020 |
| CN | 111462458 | A | 7/2020 |
| CN | 111932397 | A | 11/2020 |
| CN | 113014636 | A | 6/2021 |
| JP | 2005-527920 | A | 9/2005 |
| JP | 2019-110520 | A | 7/2019 |
| KR | 10-2016-0066292 | A | 6/2016 |
| KR | 10-2020-0082901 | A | 7/2020 |
| KR | 10-2252899 | B1 | 5/2021 |
| KR | 10-2021-0105840 | A | 8/2021 |
| WO | 2016/111916 | A1 | 7/2016 |
| WO | 2017/146313 | A1 | 8/2017 |
| WO | 2019/006179 | A1 | 1/2019 |
| WO | 2020/107497 | A1 | 6/2020 |
| WO | 2022/257181 | A1 | 12/2022 |

TRACKING SYSTEM SUPPORTED BY TELECOMMUNICATIONS SERVICE CONFIGURED FOR PERSONAL SAFETY AND SECURITY

CROSS-REFERENCE TO RELATED APPLICATIONS

This application is a continuation of U.S. patent application Ser. No. 18/307,758, filed on Apr. 26, 2023, entitled TRACKING SYSTEM SUPPORTED BY TELECOMMUNICATIONS SERVICE CONFIGURED FOR PERSONAL SAFETY AND SECURITY, which is hereby incorporated by reference in its entirety.

BACKGROUND

A tracking system, also known as a locating system, is used for observing persons or objects on the move and supplying a timely ordered sequence of location data for further processing. A myriad of tracking systems exists. Some are "lag time" indicators where data is collected after an item has passed a point; for example, a bar code or choke point or gate. Others are real-time or near real-time like Global Positioning Systems (GPS) depending on how often the data is refreshed. A tracking system can include an Internet of things (IoT) device, which is a physical object that includes sensors, processing ability, software and other technologies that connect and exchange data with other devices and systems over the Internet or other communications networks.

An example of a tracking device is the SyncUP Tracker from T-Mobile, which uses a combination of GPS technology, Wi-Fi, and a cellular network to locate the tracking device at anytime from anywhere—even from thousands of miles away. In contrast, Bluetooth-based location devices must be within a limited range of a smartphone to provide its location. The SyncUP Tracker's features include location tracking, setting up virtual boundaries, storing location history, ringing when lost, sending directions to the user, and notifying the user of tracker movements.

BRIEF DESCRIPTION OF THE DRAWINGS

Detailed descriptions of implementations of the present invention will be described and explained through the use of the accompanying drawings.

Figure 1:
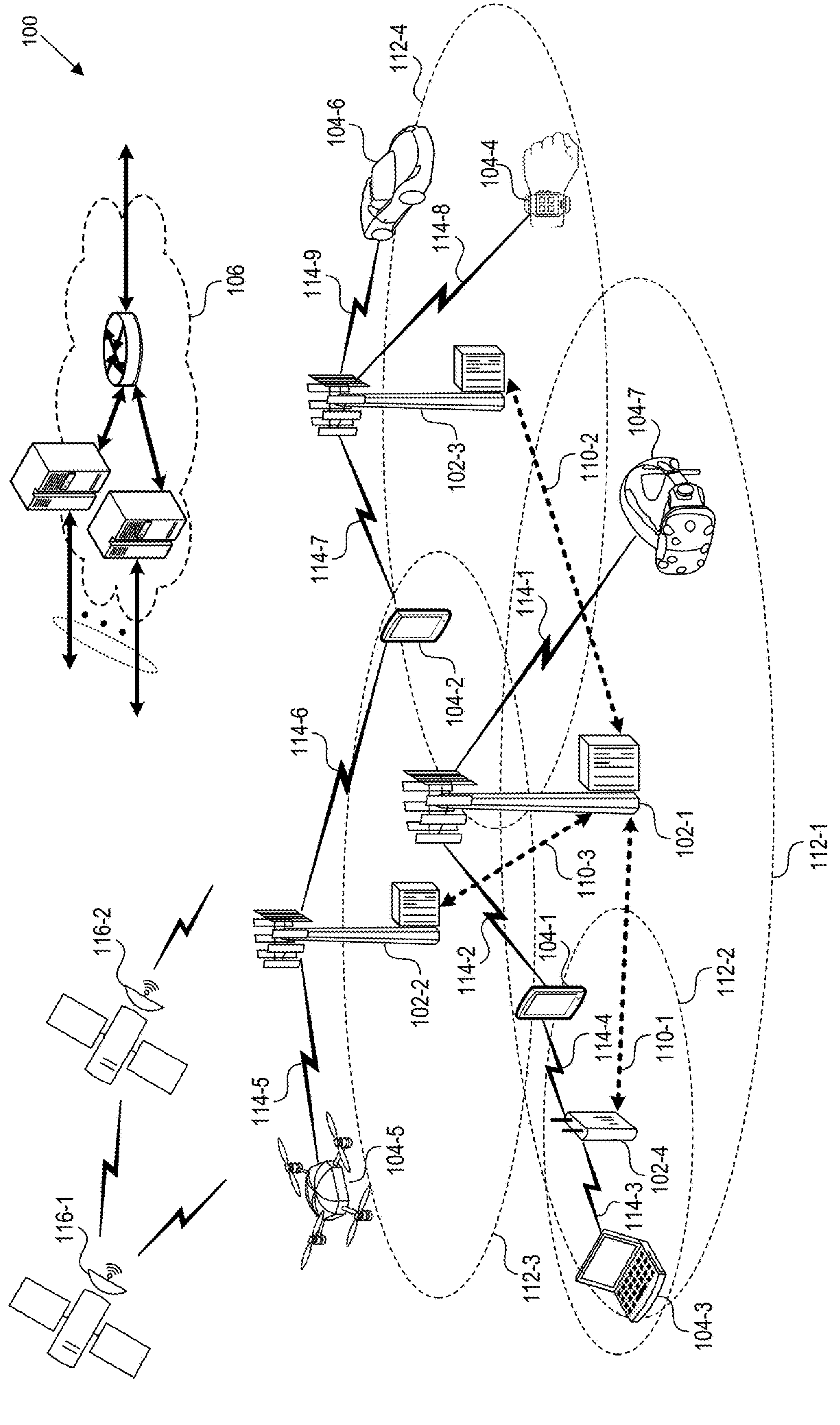
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a tracking system supported by (e.g., subscribed to) a telecommunications service to provide personal safety and security to the user. The system can include an Internet of Things (IoT) device configured as a tracker that can accompany a user and detect potential harm to the user. In one example, the tracker device can be attached to a user or an object that accompanies a location of the user (e.g., a backpack, pants, bicycle). The tracker device (e.g., the SyncUP tracker) can include a multifunctional ultraviolet (UV) meter sensor that is configured to estimate an amount of UV light being absorbed by the user, which is harmful to the user.

The tracker device can connect to the telecommunications network as part of a system that is configured to perform the process of receiving information about the weather and location of the tracker device to determine the geographic location of the user and whether the user is indoors or outdoors. The tracker device can receive data including a UV index at the user's location and compare it to the amount of UV light that the tracker device is detecting in the surrounding area. By doing so, the system can alert the user if the system determines that the user is absorbing excessive UV light (e.g., exceeds a threshold).

The multifunctional UV meter of the tracker device includes other functions in addition to measuring UV light. For example, the multifunctional UV meter of the tracker device can function as a smoke detector by measuring the density of air particles surrounding the tracker device and identify it as smoke. The tracker device can alert the user to any smoke or potential fires in their surroundings. Therefore, the multifunctional UV meter can detect and guide a user to provide personal protection from environmental conditions in particular locations.

Another aspect of the disclosed technology includes using light detection and ranging (LiDAR) or analogous visualization technology. For example, the system can include a handheld mobile wireless device (e.g., smartphone) that is paired to the tracker device. The user can scan the smartphone or the tracker device across a selected area within their environment. This allows the system to capture a three-dimensional (3D) map of the selected area. More generally, the system can perform a process of scanning the environment with laser light to travel around the environment and measure the distance using the timing of a light pulse (e.g., time of flight (ToF) technology). By scanning the environment, the system can generate the 3D map of the environment. After that, the user can select a boundary to represent a secure area. Hence, the 3D mapping including the boundary can define a secure perimeter relative to the tracker device.

As such, the system can also include a security mechanism configured to detect if a person (e.g., an unwanted cleaning staff member) enters a user's hotel room (e.g., selected area). The system can transmit an alert to the user's device (e.g., smartphone) indicating the presence of the person in the secure area. In another implementation, the user can use LiDAR of the tracker system to scan and detect any unwelcomed entity that are obscured by walls and doors. That is, the LiDAR can penetrate an obstruction to detect the presence of a person behind it. The system can use infrared or Wi-Fi technology to similarly detect the presence of a person. For example, the system can detect if Wi-Fi signals are communicated outside their door to predict whether an individual is behind a closed door.

The disclosed tracker device thus mitigates the difficulty for users to be aware of potential harm both from their environment and other people. For example, currently, users would need to buy and carry a UV meter to keep track of an amount of UV light that their body is absorbing and a separate smoke meter to detect smoke. However, by including a multifunctional UV meter in the tracker device, the user does not need to worry about carrying a UV meter or a smoke meter. The technology can alert the user to high levels of UV light and, for example, remind the user to wear or reapply sunscreen. This would avoid the user from having to worry about the health concerns associated with high UV levels. Likewise, the same multifunctional UV meter can be configured to detect smoke, which allows the tracker device to alert the user of smoke or potential fires where the user lacks awareness. This would allow the user to avoid smoke inhalation and move away from a harmful area to a safe area where the tracker device does not detect harmful smoke.

The security features thus increase personal security by detecting any unwanted actions by other individuals. For example, the tracker device can detect if any drawers were opened based on a reading from an accelerometer included in the device. In particular, the tracker device can be located within a drawer, and when the drawer is opened by a cleaning staff member, the device can send a request to the user's phone to start recording a video that documents who opened the drawer. Therefore, the user can become aware of the action and identify who performed it (e.g., the cleaning staff member). In the event something is stolen from that drawer, the user is aware of who could have done it. In another implementation, the device is able to detect individuals hidden behind structures such as walls and doors. Moreover, by tracking Wi-Fi signals, the device is able to detect if an individual is outside their door. For example, the user may hear a weird sound from a hallway. Before opening the door to check, the user can scan the door and the device will alert the user that someone is possibly outside their door; therefore, increasing security for the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

The network 100 can support IoT tracking services, for example, IoT services provided by an application of the wireless devices 104. For instance, the location of an IoT device within the tracking system provided by an application of the wireless devices 104 can be communicated between multiple wireless devices 104 connected to the network 100. In other cases, the network 100 can support one or more services needed to provide the location of the IoT device. For example, an IoT tracking service can be administered on a remote server of the network 100 that is communicatively coupled to the wireless devices 104. A remote server of the network 100 can store the location data of the IoT device. In another example, IoT tracking service can store information about the weather of the environment including the indication of harm to the user on a remote server.

Tracking System

Figure 2A:
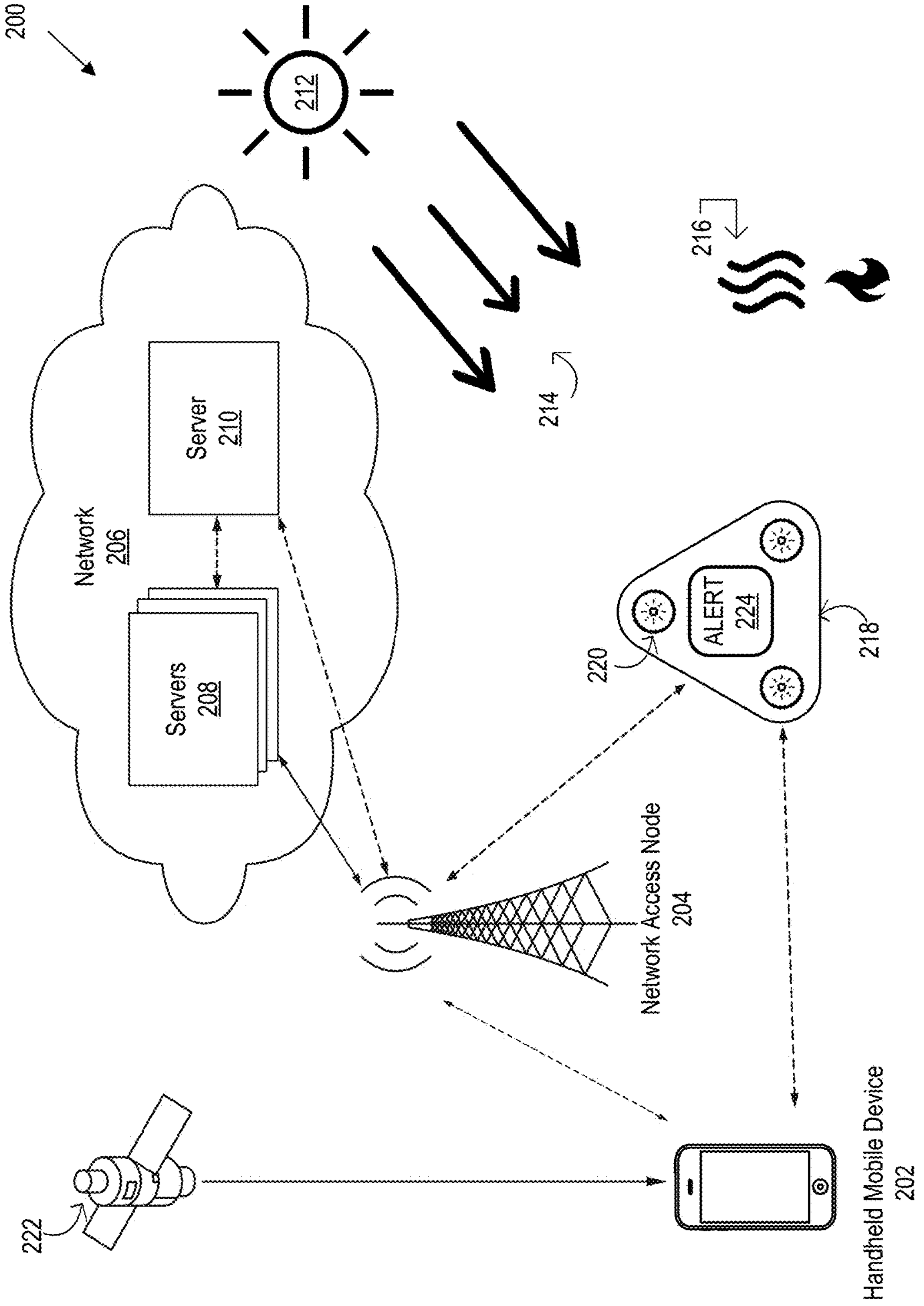
FIG. 2A is a schematic diagram that illustrates a tracking system including an Internet of Things (IoT) device with a multifunctional ultraviolet (UV) sensor.

A growing portion of Internet-of-Things (IoT) devices are designed for consumer use and enable connected vehicles, home automation, wearable technology, connected health, and appliances with remote monitoring capabilities. FIG. 2A is a schematic diagram 200 that illustrates a tracking system including an IoT device 218 that is operable to track locations and personal risks to users and configured to provide personal safety and security. The IoT device 218 includes sensors, processing components, software, and other components configured to connect and exchange data with other devices and systems over the Internet or other communications networks. As such, the IoT device 218 can detect features of its physical surroundings including environmental conditions and physical objects or groups of objects that pose a personal safety or security risk to the user.

An IoT device can have limited functionality compared to smart devices such as smartphones or smart watches. A smart device such as a smartphone is operable by a human to connect to other devices using wireless protocols, whereas an IoT device can connect to other devices without the need for human interaction. Moreover, IoT devices can have limited power resources that require power management such as intermittent power use. For example, an IoT device can turn on and off according to a schedule. In contrast, a smartphone can operate continuously until its battery discharges because the smartphone can be readily recharged. By using power intermittently, an IoT device can be energy efficient and have longer battery life. Therefore, an IoT device is a smart device, but a smart device may not always be considered an IoT device.

The IoT device 218 includes a multifunctional ultraviolet light (UV) sensor 220 that can measure an intensity and duration of light and measure a concentration of particles in the air (e.g., UV particles). The UV sensor operates as a UV detector that is configured to measure an amount of UV or visible light absorbed by the sensor and output the measured amount in terms of a UV index. The UV index is an international standard measurement of the strength of the sunburn-producing UV radiation at a particular place and time. It is primarily used in daily and hourly forecasts aimed at the general public. The UV index is an open-ended linear scale, directly proportional to the intensity of UV radiation that causes human skin to sunburn.

The UV index can help individuals effectively protect themselves from UV radiation, which has health benefits in moderation but in excess causes sunburn, skin aging, DNA damage, skin cancer, immunosuppression, and eye damage such as cataracts. As illustrated, the UV sensor 220 is disposed in the IoT device 218. The physical environment, external to the IoT device 218, includes the sun 212, sunlight rays 214 emitted by the sun 212, and smoke 216. The UV sensor 220 can measure the amount of UV light from sunlight rays 214 by measuring specific wavelengths of the sunlight rays 214. For example, when the UV sensor 220 receives sunlight rays 214, a semiconductor of the UV sensor 220 can generate an electric current in proportion to the light. This electric current can be measured, output as a UV index, and displayed on the IoT device 218. The IoT device 218 can set a threshold for UV light in the environment, where exceeding the threshold indicates a potential risk or threat of personal harm to the user.

The IoT device 218 includes a global positioning system (GPS) sensor configured to determine a current location of the IoT device 218. By determining its location, the IoT device 218 can set different thresholds for different locations. For example, a threshold can be set to UV index A when the IoT device 218 is located outdoors. However, the threshold may be set to UV index A-B, when the IoT device 218 is located indoors. If the measured UV index exceeds the threshold, the IoT device 218 can generate an indication (e.g., human perceivable alert) of potential harm to the user.

As illustrated, the IoT device 218 presents an alert 224 based on the indication of the potential harm to the user. In another example, the IoT device 218 determines its location and checks local weather information by wirelessly communicating with a weather service that provides access to current weather information. As such, the IoT device 218 can modify a threshold based on its location and weather conditions. For example, the IoT device 218 can determine that the day is rainy and lower the UV threshold accordingly.

The UV sensor 220 is multifunctional because it can detect multiple environmental conditions that could harm the user, in addition to UV light. For example, the UV sensor 220 can measure particles in the environment of the IoT device 218. That is, the UV sensor 220 measure particles relative to light in the environment. By checking the density of surrounding particles, the UV sensor 220 can detect smoke 216 in the environment. The IoT device 218 can determine that the amount of particles measured in the air surpasses a threshold and alert a user of a risk. For example, if the IoT device 218 detects heavy smoke in the air for over five seconds, the IoT device 218 can display the alert 224 to warn the user of the smoke. The alert can include an audible component (e.g., playing a sound) or a visual component (e.g., lighting up a screen of the IoT device 218 with a message).

The IoT device 218 can adjust a measure of particles or adjust a threshold based on location or weather information. For example, an amount of measured particles can be adjusted based on pollution levels at urban or industrial locations. In another example, weather events such as rain or wind can decrease or increase a measure of particles that are not harmful to a user. As such, the amount of measured particles can be adjusted to compensate for locations or weather events. Likewise, the threshold can be adjusted to adapt to the location or weather conditions, to ensure that a user is notified of an actual risk or threat while avoiding false positives.

The IoT device 218 can connect to a telecommunications network 206 through a network access node 204. A handheld mobile device 202 can also connect to the telecommunications network 206 and a satellite 222. The IoT device 218 can be paired to the handheld mobile device 202 through a short-range radio link, for example. When the IoT device 218 determines potential harm to the user, the IoT device 218 can communicate the indication of the potential harm to the handheld mobile device 202 via the one or more network interfaces, through the network access node 204 or directly over a short-range radio link. The handheld mobile device 202 can then present an alert based on the indication of the potential harm (e.g., harm of excessive UV exposure or harm of smoke inhalation).

The telecommunications network 206 can administer an IoT tracking service, where the IoT device 218 and handheld mobile device 202 are subscribed to the IoT tracking service. The IoT tracking service can store location data of the handheld mobile device 202 and IoT device 218. The location data is indicative of the location of the user and the IoT device 218. The location data can be detected by the GPS sensor of the IoT device 218 or the handheld mobile device 202. By storing the location data of the IoT device 218, the user can readily locate the IoT device 218 by using the handheld mobile device 202. If the user attaches the IoT device 218 to a personal belonging such as a backpack, the user can track the location of the backpack through the IoT tracking service. The servers 208 and server 210 can store location data of each IoT device subscribed to the IoT tracking service and perform other functions to support the tracking system.

Figure 2B:
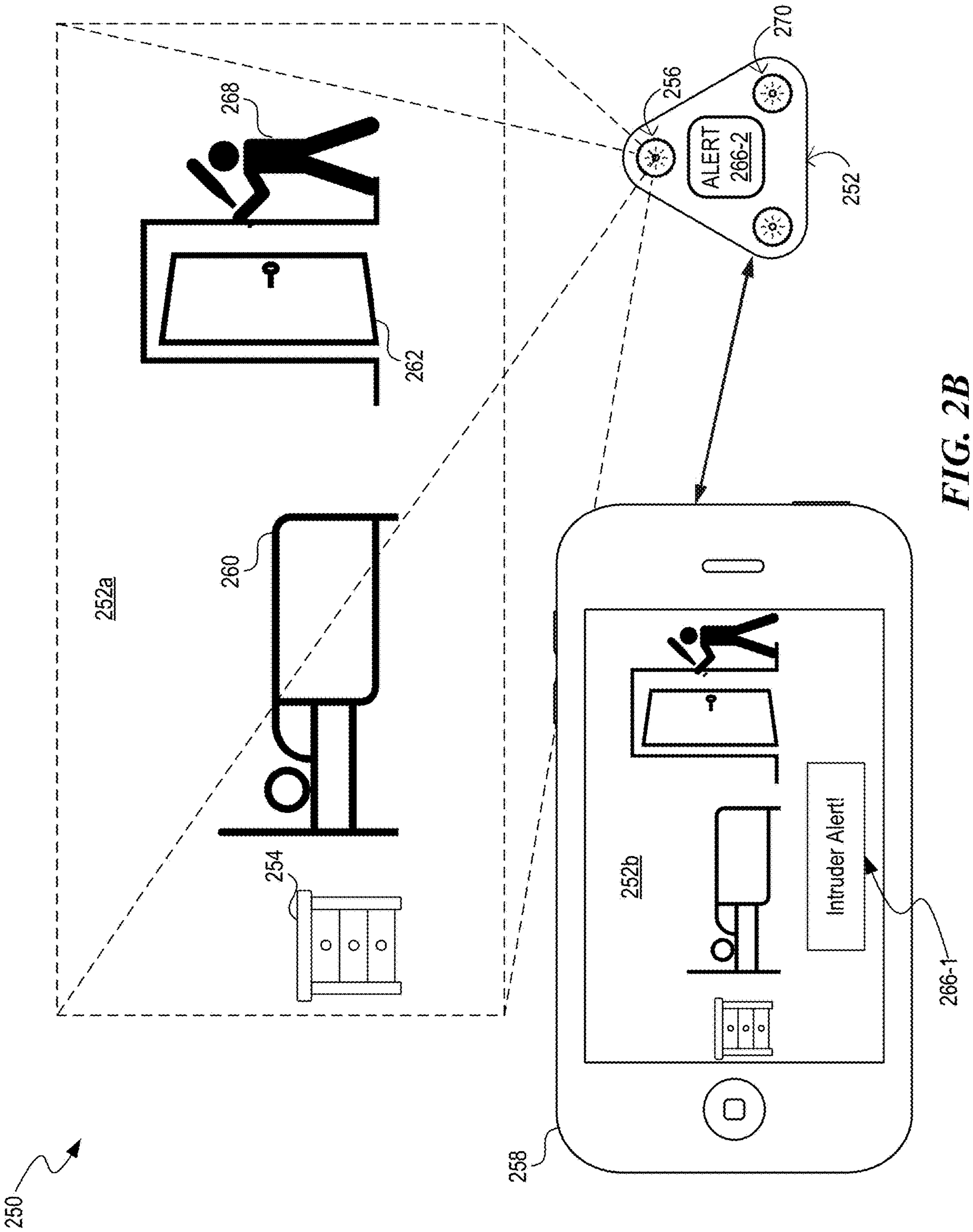
FIG. 2B is a schematic diagram that illustrates a tracking system that can detect the presence of entities by using visualization technology.

FIG. 2B is a schematic diagram 250 that illustrates a tracking system including an IoT device 252 that is operable to generate a three-dimensional (3D) visualization of a physical environment 252*a* for detecting the presence of unexpected objects therein. The unexpected objects can include individuals that pose a potential threat to safety of the user. As such, the tracking system can track the IoT device 252, which is operable to provide personal safety and security by detecting the presence of unexpected objects.

The IoT device 252 can include one or more Time of Flight (ToF) sensors 256 that can capture and/or generate a 3D visualization 252*b* of the environment 252*a*. As illustrated, the environment 252*a* includes physical objects such as a nightstand 254, a bed 260, and a door 262. The ToF sensors 256 determine depth information based on measurements of distances from the IoT device 252 to the one or more objects (e.g., the nightstand 254, the bed 260, the door 262) in the environment 252*a*. The tracking system can generate the 3D visualization 252*b* of the environment 252*a* based on the depth information collected by the one or more ToF sensors 256.

The one or more ToF sensors 256 can be disposed at the IoT device 252 and/or a handheld mobile device 258 that is paired to the IoT device 252. After performing depth measurements, the IoT device 252 can generate the 3D visualization 252*b* of the environment 252*a* as a baseline 3D visualization. As illustrated, the 3D visualization 252*b* is rendered for display on the handheld mobile device 258. The IoT device 252 can monitor a specific zone of the environment 252*a* as designated by the user. For example, a user can manipulate a cursor on the 3D visualization 252*b* to define boundaries for a secure zone of the environment 252*a*. The IoT device 252 can be positioned to monitor the secure zone with the ToF sensors 256. The IoT device 252 can detect, relative to the baseline 3D visualization 252*b* of the environment 252*a*, the unexpected presence of a person in the secure zone of the environment 252*a*.

In one example, the ToF sensors 256 are sensors of a LIDAR scanner that is built into the IoT device 252 and/or the handheld mobile device 258. The LiDAR scanner is used to create the 3D visualization 252*b* of the environment 252*a*. LiDAR, as used herein, refers to "light detection and ranging" or "laser imaging, detection, and ranging" technology that performs processes for determining ranges by targeting objects or surfaces with lasers, and measuring the time for reflected light to return to a receiver. It is sometimes called 3D laser scanning, a special combination of 3D scanning and laser scanning. LiDAR can use ultraviolet, visible, or near-infrared light to image objects to make high-resolution maps; therefore, the LiDAR scanner can emit a grid of dots in a form of near-infrared wavelengths and measure the amount of time it takes for the dots to travel from either the handheld mobile device 258 or IoT device 252 to the environment 252*a*. This allows the ToF sensors 256 to accurately capture the depth of the environment 252*a*.

After that, to monitor the environment 252*a*, the IoT device 252 can set a boundary and check whether an object has crossed that boundary. For example, a user at a hotel may want to ensure that no one enters the room while the user is sleeping. The IoT device 252 can be positioned in view of the hotel door to monitor a secure zone that includes the door, based on a boundary set by the user. If an individual crosses the boundary to enter the room, the handheld mobile device 258 can generate an alert 266-1 to inform the user of the presence of an intruder. Alternatively or additionally, the IoT device 252 can generate an alert 266-2 individually or in combination with the alert 266-1 to inform the user of the presence of an intruder.

In another implementation, the IoT device 252 can detect the presence of an unexpected individual by exchanging WiFi signals with surrounding devices. For example, the IoT device 252 can broadcast signals to devices connected to a WiFi network covering the environment 252*a*. The IoT device 252 can generate a map based on an exchange of wireless signals with other devices in or near the environment 252*a*. For example, WiFi signals can be broadcast by the IoT device 252 to nearby devices periodically, continuously, or according to a schedule. A baseline map is generated based on an initial exchange of wireless signals such that any changes to an expected exchange of signals can be analyzed to determine patterns indicative of an unexpected object present in the environment 252*a*. Implementations can use other types or forms of radio waves that can penetrate non-conducting materials, such as wood, brick, and concrete. Additional examples include WiFi-like radio waves or WiFi improvements (e.g., ultra-high-speed WiFi) and laser-based signals.

The IoT device 252 can then periodically, continuously, or programmatically monitor changes in the exchange of wireless signals with the devices. An individual's movement within the environment 252*a* can interfere with the process for exchanged signals. As such, the IoT device 252 can detect the motion and predict presence of the individual. In one example, if a user is worried that an intruder (e.g., intruder 268) is hiding behind a door. The user can use the IoT device 252 to detect movement behind the door. Alternatively, if the intruder 268 is carrying a mobile device that is operable to communicate on WiFi, then the IoT device 252 can detect presence of the intruder 268 behind the door based on feedback from the intruder 268's mobile device.

In another implementation, the IoT device 252 includes an accelerometer 270 that is configured to detect movement of the IoT device 252. For example, a user can place the IoT device 252 in a drawer of the nightstand 254 to detect whether an individual has opened the drawer. Upon the accelerometer 270 detecting movement, the IoT device 252 can communicate an indication that the IoT device 252 has moved to the handheld mobile device 258 via one or more network interfaces, through a network access node or a telecommunications network or directly through a short-range radio connection. The communicated indication of the movement can cause the handheld mobile device 258 to activate a camera that captures images and/or activate a microphone to capture audio of the environment 252*a*. For example, when the user is staying at a hotel, a maid may open the drawer with the IoT device 252 located inside. The user may leave the handheld mobile device 258 to monitor the area surrounding the IoT device 252 such that the handheld mobile device 258 is caused to start recording video in response to the detected movement.

Figure 3:
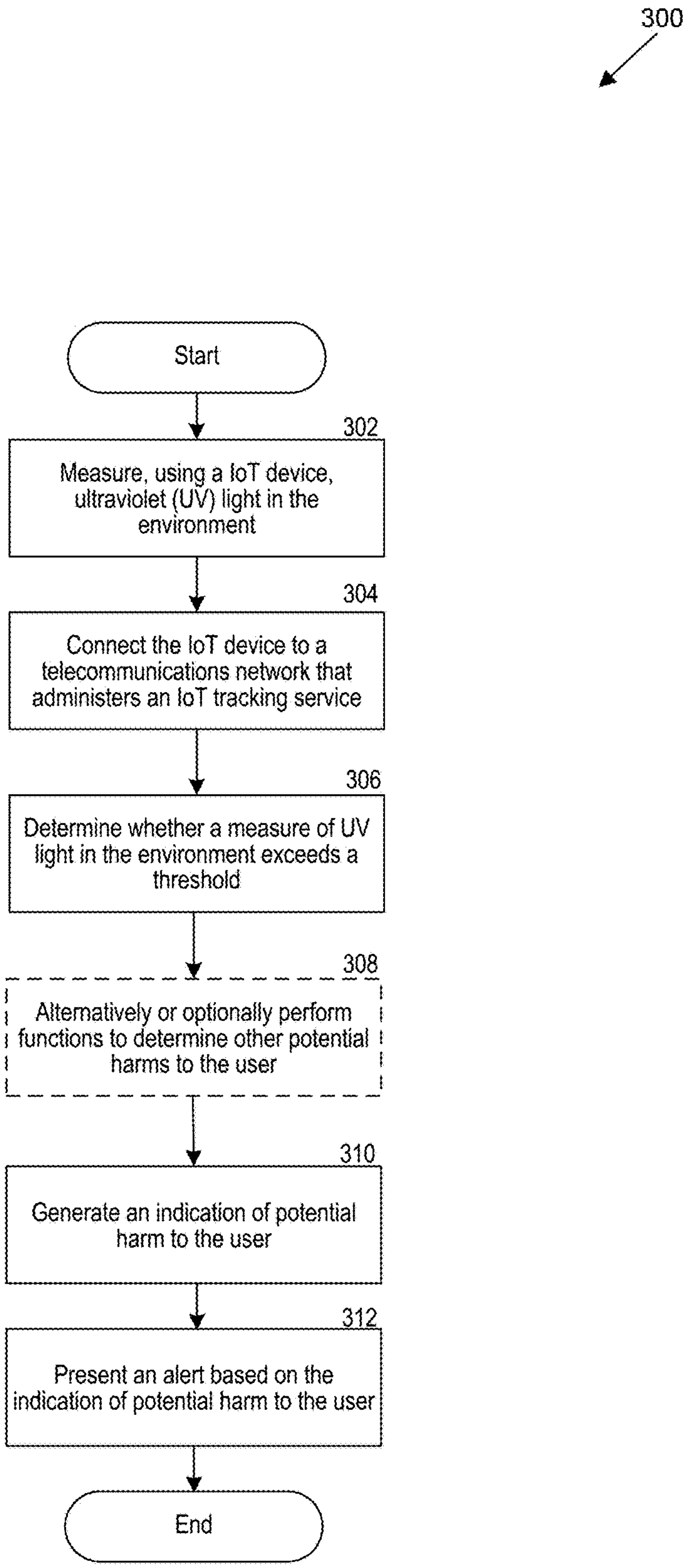
FIG. 3 is a block diagram that illustrates a method performed by a tracking system to provide personal safety and security to a user.

FIG. 3 is a flow diagram that illustrates a method 300 performed by a tracking system to provide personal safety and security to a user. The method 300 can be performed by the tracking system including, for example, an IoT device and/or a server coupled to the handheld mobile device over a communications network (e.g., a telecommunications network). In one example, the IoT device includes a multifunctional UV light sensor, one or more ToF sensors, an accelerometer, and a GPS sensor. The IoT device and/or server include at least one hardware processor, and at least one non-transitory memory storing instructions that, when executed by the at least one hardware processor, cause the system to perform the method 300.

At 302, the tracking system causes the multifunctional UV sensor to measure UV light in the environment. The multifunctional UV sensor is disposed in the IoT device. The multifunctional UV sensor measures an intensity and duration of light and/or measure a concentration of particles in the air (e.g., UV particles). The UV sensor operates as a UV detector that is configured to measure an amount of UV or visible light absorbed by the sensor and output the measured amount in terms of a UV index. The UV index is an international standard measurement of the strength of the sunburn-producing UV radiation at a particular place and time. The UV index is an open-ended linear scale, directly proportional to the intensity of UV radiation that causes human skin to sunburn. The multifunctional UV sensor can also measure smoke particles in an environment of the IoT device. For example, the UV sensor can measure particles in the environment of the IoT device. That is, the UV sensor measures particles relative to light in the environment. By checking the density of surrounding particles, the UV sensor can detect smoke in the environment.

In one implementation, to determine potential harm to a user in an environment, the tracking system causes a GPS sensor within the IoT device to detect the location of the IoT device. For example, the tracking system can determine the location of the IoT device based on the location data produced by the GPS sensor. Therefore, the tracking system is able to utilize the UV index according to the environment the IoT device is located in. For example, the UV index can indicate it is safe for the user in the IoT device to be outdoors in the sun in one city (e.g., New York City) but not in another city (e.g., San Diego).

At 304, the tracking system connects the IoT device to a telecommunications network that administers an IoT tracking service. The IoT device and handheld mobile device are subscribed to the IoT tracking service. In one embodiment, the IoT tracking service stores location data of the handheld mobile device and of the IoT device. The location data is indicative of the location of the user and the IoT device, for example.

At 306, the tracking system determines whether a measure of UV light in the environment exceeds a threshold. The threshold can vary depending on the location of the IoT device. For example, the threshold changes depending on an indication of weather at the location of the IoT device. In another function, the tracking system determines whether a measure of smoke particles obtained in the environment exceeds the threshold. For example, after determining the location of the IoT device based on the location data produced by the GPS sensor, the threshold changes depending on whether the location is indoors or outdoors. For instance, the IoT device can determine that the amount of particles measured in the air surpasses a threshold, such as heavy smoke in the air indoors for over five seconds.

At 308, the tracking system can alternatively or optionally perform functions to determine other potential harms to the user. For example, an accelerometer disposed in the IoT device can detect movement of the IoT device. The IoT device can communicate an indication of the detected movement to the handheld mobile device via the one or more network interfaces. In one example, the communicated indication of the detected movement of the IoT device causes the handheld mobile device to activate a camera configured to capture images or audio of the environment, thereby potentially recording what caused the movement.

In another example, the tracking system can determine a potential harm to the user by causing the IoT device to transmit a pattern of signals to multiple devices at or near the environment. The pattern of signals can detect a delay to receive feedback signals from the multiple devices. The IoT device can generate a map based on the exchange of WiFi signals (or other wireless signals). The map can include each frequency band from each device. The IoT device can scan the environment continuously, periodically, or in accordance with a schedule for exchanged signals. As such, the IoT device can detect a disturbance to an expected exchange of signals with the multiple devices, where the disturbance is indicative of presence of an object in the environment.

At 310, the tracking system generates an indication of potential harm to the user. In one example, the tracking system generates an indication of potential harm to the user when the measure exceeds the threshold. In one example, after determining that the amount of particles measured in the air surpasses a threshold, the tracking system can generate an alert at the IoT device to the user about the potential harm (e.g., heavy smoke in the air indoors). In an example, the tracking system generates an alert at the IoT device based on the indication of potential harm to the user. The alert includes at least an audible component (e.g., playing a sound) or a visual component (e.g., lighting up a screen of the IoT device with a message).

At 312, the tracking system presents an alert based on the indication of the potential harm to the user. In another embodiment, the IoT device can communicate the indication of the potential harm to the handheld mobile device via the one or more network interfaces. The IoT device can cause the handheld mobile device to present an alert based on the indication of the potential harm.

In another implementation, the tracking system can determine a potential harm to the user by causing the one or more ToF sensors disposed in at least one of the handheld mobile device or disposed in the IoT device to detect the presence of a person. The ToF sensors can detect distances to one or more objects in the environment relative to the IoT device. For example, a baseline three-dimensional (3D) visualization of the environment is generated based on an output of the one or more ToF sensors. The IoT device can detect, relative to the baseline 3D visualization of the environment, a presence of a person in a zone. The zone of the 3D visualization selected for monitoring presence. The one or more ToF sensors emit a grid of dots in a form of near-infrared wavelengths and measure an amount of time it takes for the dots to travel from the IoT device to the environment and be reflected back to a receiver of the IoT device.

Computer System

Figure 4:
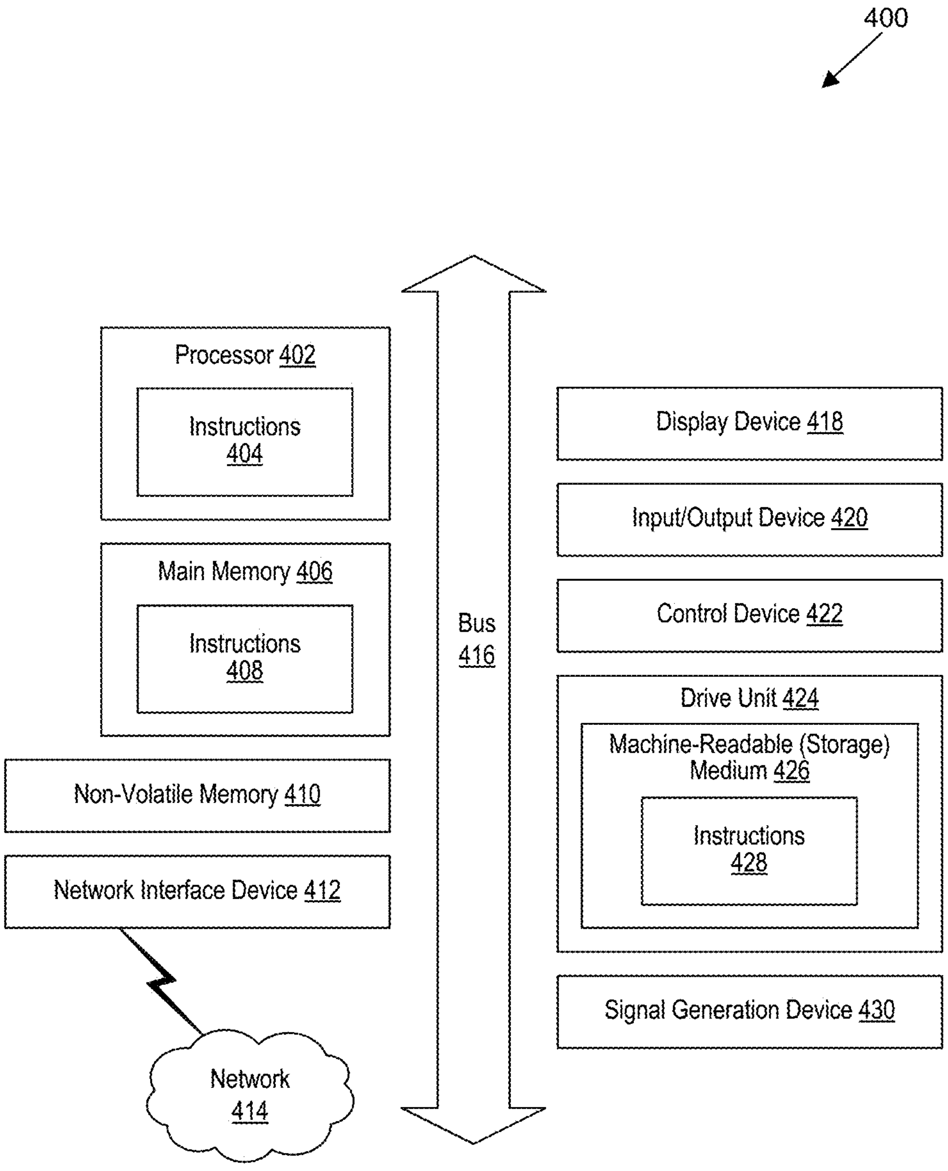
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A non-transitory, computer-readable storage medium comprising instructions recorded thereon, wherein the instructions when executed by at least one data processor of a system, cause the system to:

cause a wireless device to emit a grid of dots in a form of ultraviolet (UV), visible, or near-infrared wavelengths;

measure an amount of time for the dots to travel from the wireless device to an environment sounding the wireless device and reflect back to a receiver of the wireless device;

generate a baseline three-dimensional (3D) visualization of the environment surrounding the wireless device, wherein the baseline 3D visualization at least partially includes an area obscured by a solid object;

monitor for changes in the baseline 3D visualization of the environment, based on a change in the amount of time for the dots to reflect back to the wireless device;

detect, relative to the baseline 3D visualization of the environment, movement in a zone of the 3D visualization of the environment;

generate an alert at the wireless device based on the detected movement and an indication of a potential harm caused by the detected movement; and cause the wireless device to present the alert.

2. The at least one non-transitory computer-readable storage medium of claim 1, wherein the system is further caused to:

set a boundary within the baseline 3D visualization of the environment; and detect an object crossing the boundary.

3. The at least one non-transitory computer-readable storage medium of claim 1, wherein the system is further caused to:

detect a presence of a WiFi-enabled device located behind an opaque object; and generate a second alert based on the detected presence of the WiFi-enabled device.

4. The at least one non-transitory computer-readable storage medium of claim 1, wherein the system is further caused to:

detect, using an accelerometer, a movement of the wireless device; and record, using a camera, images or audio of the environment in response to the detected movement.

5. The at least one non-transitory computer-readable storage medium of claim 1, wherein the system is further caused to:

determine a location of the wireless device based on location data produced by a global positioning system; and determine whether the location of the wireless device is indoors or outdoors.

6. The at least one non-transitory computer-readable storage medium of claim 5, wherein the system is further caused to:

measure, using a UV sensor on the wireless device, UV light in the environment surrounding the wireless device;

set a threshold UV light value based on a UV index at the location of the wireless device when the wireless device is outside; and generate an alert at the wireless device when the measure of UV light exceeds the threshold UV light value.

7. The at least one non-transitory computer-readable storage medium of claim 1, wherein the system is further caused to:

cause the wireless device to transmit a pattern of radio signals to a second wireless device in the environment;

cause the wireless device to receive feedback signals from the second wireless device;

generate a map based on a pattern of radio signals; and detect a disturbance in the pattern of radio signals based on a presence of an object in the environment, wherein the wireless device is configured to detect a delay in receiving the feedback signals from the second wireless device.

8. A wireless device comprising:

at least one hardware processor; and at least one non-transitory memory storing instructions, which, when executed by the at least one hardware processor, cause the wireless device to:

emit a grid of dots from the wireless device in a form of ultraviolet (UV), visible, or near-infrared wavelengths;

measure an amount of time for the dots to travel from the wireless device to an environment surrounding the wireless device and reflect back to a receiver of the wireless device;

generate a baseline three-dimensional (3D) visualization of the environment surrounding the wireless device, wherein the baseline 3D visualization at least partially includes an area obscured by a solid object;

detect, relative to the baseline 3D visualization of the environment, movement in a zone of the 3D visualization of the environment; and generate an alert based on the detected movement and an indication of a potential harm caused by the detected movement.

9. The wireless device of claim 8, further caused to:

set a boundary within the baseline 3D visualization of the environment; and detect an object crossing the boundary.

10. The wireless device of claim 8, further caused to:

detect a presence of a WiFi-enabled device located behind an opaque object; and generate a second alert based on the detected presence of the WiFi-enabled device.

11. The wireless device of claim 8, further caused to:

detect, using an accelerometer, a movement of the wireless device; and record, using a camera, images or audio of the environment in response to the detected movement.

12. The wireless device of claim 8, further caused to:

determine a location of the wireless device based on location data produced by a global positioning system; and determine whether the location of the wireless device is indoors or outdoors.

13. The wireless device of claim 12, further caused to:

measure, using a UV sensor on the wireless device, UV light in the environment surrounding the wireless device;

set a threshold UV light value based on a UV index at the location of the wireless device when the wireless device is outside; and generate an alert at the wireless device when the measure of UV light exceeds the threshold UV light value.

14. The wireless device of claim 8, further caused to:

transmit a pattern of radio signals to a second wireless device in the environment, receive feedback signals from the second wireless device;

generate a map based on a pattern of radio signals; and detect a disturbance in the pattern of radio signals based on a presence of an object in the environment, wherein the wireless device is configured to detect a delay in receiving the feedback signals from the second wireless device.

15. A method comprising:

causing a wireless device to emit a grid of dots from the wireless device in a form of ultraviolet, visible, or near-infrared wavelengths;

measuring an amount of time for the dots to travel from the wireless device to an environment and reflect back to a receiver of the wireless device;

generating a baseline three-dimensional (3D) visualization of the environment surrounding the wireless device, wherein the baseline 3D visualization at least partially includes an area obscured by a solid object;

detecting, relative to the baseline 3D visualization of the environment, movement in a zone of the 3D visualization of the environment; and generating an alert at the wireless device based on the detected movement and an indication of a potential harm caused by the detected movement.

16. The method of claim 15, further comprising:

setting a boundary within the baseline 3D visualization of the environment; and detecting an object crossing the boundary.

17. The method of claim 15, further comprising:

detecting a presence of a WiFi-enabled device located behind an opaque object; and generating a second alert based on the detected presence of the WiFi-enabled device.

18. The method of claim 15, further comprising:

detecting, using an accelerometer, a movement of the wireless device; and recording, using a camera, images or audio of the environment in response to the detected movement.

19. The method of claim 15, further comprising:

determining a location of the wireless device based on location data produced by a global positioning system;

determining whether the location of the wireless device is indoors or outdoors;

measuring, using an ultraviolet (UV) sensor on the wireless device, UV light in the environment of the wireless device;

setting a threshold UV light value based on a UV index at the location of the wireless device when the wireless device is outside; and generating an alert at the wireless device when the measure of UV light exceeds the threshold UV light value.

20. The method of claim 15, further comprising:

causing the wireless device to transmit a pattern of radio signals to a second wireless device in the environment;

causing the wireless device to receive feedback signals from the second wireless device;

generating a map based on a pattern of radio signals; and detecting a disturbance in the pattern of radio signals based on a presence of an object in the environment, wherein the wireless device is configured to detect a delay in receiving the feedback signals from the second wireless device.

* * * * *